US009849646B2

(12) United States Patent
Townsend

(10) Patent No.: US 9,849,646 B2
(45) Date of Patent: Dec. 26, 2017

(54) DUNNAGE FORMING MACHINE AND METHOD OF FORMING DUNNAGE

(75) Inventor: Jonathan Townsend, Stevenage (GB)

(73) Assignee: Easypack Limited, Stevenage (GB)

( * ) Notice: Subject to any disclaimer, the term of this patent is extended or adjusted under 35 U.S.C. 154(b) by 878 days.

(21) Appl. No.: 13/982,842

(22) PCT Filed: Dec. 23, 2011

(86) PCT No.: PCT/GB2011/052587
§ 371 (c)(1),
(2), (4) Date: Jul. 31, 2013

(87) PCT Pub. No.: WO2012/104573
PCT Pub. Date: Aug. 9, 2012

(65) Prior Publication Data
US 2013/0310240 A1 Nov. 21, 2013

(30) Foreign Application Priority Data
Feb. 4, 2011 (GB) .................................. 1101934.6

(51) Int. Cl.
*B31D 5/00* (2017.01)
*F16H 1/00* (2006.01)

(52) U.S. Cl.
CPC ............. *B31D 5/00* (2013.01); *B31D 5/0047* (2013.01); *B31D 2205/0047* (2013.01)

(58) Field of Classification Search
CPC ............... F16H 1/00; F16H 1/22; F16H 37/06
USPC ......................... 493/464, 350–352, 407, 967
See application file for complete search history.

(56) References Cited

U.S. PATENT DOCUMENTS

| | | | | |
|---|---|---|---|---|
| 2,786,399 A * | 3/1957 | Mason | B31D 5/0082 | 210/442 |
| 7,044,903 B2 * | 5/2006 | Simmons, Jr. | B31D 5/0047 | 493/464 |
| 7,771,338 B2 * | 8/2010 | Wetsch | B31D 5/0052 | 493/464 |
| 2004/0052988 A1 * | 3/2004 | Slovencik | B31D 5/0052 | 428/34.2 |

FOREIGN PATENT DOCUMENTS

WO 9701434 A2 1/1997

OTHER PUBLICATIONS

International Search Report for PCT/GB2011/052587 dated Mar. 23, 2012.

* cited by examiner

*Primary Examiner* — Andrew M Tecco
*Assistant Examiner* — Praachi M Pathak
(74) *Attorney, Agent, or Firm* — Dorsey & Whitney LLP

(57) ABSTRACT

A driven crimping gear (10) cooperates with the first idler crimping gear (12) and the second idler crimping gear (14). The gears pull paper of a roll (12) which paper has had the edges curled over. The paper is guided through the gears by plates (28) and (30).

23 Claims, 4 Drawing Sheets

DUNNAGE FORMING MACHINE AND METHOD OF FORMING DUNNAGE

TECHNICAL FIELD AND BACKGROUND OF THE INVENTION

The present invention relates to dunnage forming machines and methods of operating such machines. The present invention is particularly suitable for machines using paper to make dunnage.

In known machines it is desirable to curl the edges of a sheet of paper over prior to forming the dunnage by passing the curled paper through gears. However, the number of curls that can be formed is restricted thus resulting in the dunnage having less bulk than would otherwise be desired.

Another problem with known machines is the space they take up as they produce dunnage with rotatably members that are located in a line.

A further problem with known machines is that several parts are rotatable and it is necessary to connect a common drive to those parts. Such connection of a common drive to many parts is complicated and expensive and requires regular maintenance.

BRIEF SUMMARY OF THE INVENTION

It is an object of the present invention to overcome at least one of the above or other disadvantages.

According to a first aspect of the present invention a dunnage forming machines includes: dunnage forming machine including cooperating dunnage forming gears including a sun gear arranged to cooperate with at least two planet gears and in which the material being transformed into the dunnage is arranged to travel around the sun gear between the planet gears.

A first pair of spaced guides may be arranged to cooperate with the dunnage being formed and arranged to face one side of the dunnage. The spaced guides may be arranged to cooperate with the dunnage being formed and may be arranged to face the other side of the dunnage. The spaced guides may be arcuate along at least part of there extent and the arc of the spaced guide may be about the same axis as that of the sun gear. The arc of the first pair of spaced guides may be greater than the arc of the outer ? dimension of the sun gear. The arc of the second pair of guides may be less than one of the dunnage forming portion of the sun gear. At least one of the first or second pair of guides may be directed towards the sun gear and the first planet gear. The first pair of guides may leave the last cooperating sun and planet gears in a direction perpendicular to a line connecting the rotational axis of the last cooperating sun and planet gears.

The guides may be adjacent to the gears in an axial direction.

No constraint may be placed on the edges of the dunnage as the dunnage travels through the sun and planet gears.

There may be more than two planet gears.

At least one of the sun gears may have a different diameter than the planet gears.

A line connecting the rotational axis of the first planet gear and the sun gear may be at right angles to align connecting the rotational axis of the last planet gear and sun gear.

A line connecting the rotational axis of the first planet gear and the sun gear may extend in the opposite direction to a line connecting the rotational axis of the last planet gear and the sun gear. The lines may be parallel.

The sun gear may be a driven gear and the planet gears may be arranged to be driven by the sun gear. The sun gear may be rotatable in one direction only.

According to further aspects of the present invention a method of forming dunnage comprises: causing material to be formed into dunnage by driving the material through at least two planet gears, each of which cooperate with a common sun gear and causing the material to travel around the sun gear between the planet gears.

The method may comprise guiding the dunnage around the sun gear.

The method may comprise causing the material to enter the first cooperating planet and sun gears in the first direction and causing the material to leave the last cooperating planet and sun gear in a second direction transverse to the first direction.

The method may comprise the material being caused to enter the first cooperating planet and sun gears in the first direction and causing the material to leave the last cooperating planet and sun gears in the second direction, opposed to the first direction.

The present invention includes a method of forming dunnage as herein referred to when using a machine as here referred to.

According to a further aspect a dunnage forming machine includes: a feeding station arranged in use to feed material to a dunnage forming station, the feeding station including a first part that converges inwardly towards the forming station in which the material is constrained to pass over the first part within the side parts with the side parts being arranged to at least partially furl over the edges of the material characterised in that, downstream from the first part, a pair of projections converge towards each other and towards the forming station around which projections, in use, the material is arranged to be further furled.

The projections may comprise rods.

At a downstream end at least one of the projections they have a cross-sectional width more than the distances between the projections. The distance across the outsides of the projections and there downstream end may be at least the same as the axial width of dunnage forming gears at the forming station.

The distance across the outer sides of the projection at the downstream end may be the same as or less than the axial width of dunnage forming gears at the forming station.

A first pair of spaced guides may be provided arranged to cooperate with the dunnage being formed and arranged to face the same side of the dunnage in which the distance between the guides at the start of the forming station is greater than the distance between a projections at there downstream ends. A second pair of spaced guides may be arranged to cooperate with the dunnage being formed and may be arranged to face the same side of the dunnage which side is opposed to the side of the faces of the first guides in which the distance between the second guides at the start of the forming station may be greater than the distance between the projections at there downstream end.

A method of using a dunnage machine including a feeding station that feeds a dunnage forming station comprising passing the material to be formed into dunnage through the feeding station over a first part and causing the sides of the material to be furled over by constraining the material to pass within converging side parts and, downstream of the first part, causing the material to furl over a pair of projections that extend towards each other and towards the forming station with the material being caused to undergo further furling around the projections.

The method may comprise pulling the material through the feeding station.

According to a further aspect of the present invention a dunnage forming machine includes: a dunnage forming machine including a feeding station arranged, in use to feed material to a dunnage forming station the machine including pulling means arranged to pull the material through the feeding station, the downstream region of the feeding station being arranged to feed the material in a first direction and the pulling means being arranged to pull in a second direction, offset from the first direction.

The downstream end region of the feeding station may comprise a pair of projections that converge towards each other and towards the forming station around which projections the material may be arranged to furl.

The cross-sectional width of each projection at the downstream end may be more of a distance between the projections. The distance across the outer sides of the projections at the downstream end may be the same as the actual width of the dunnage forming gears at the forming station.

The distance across the outer sides of the projection at the downstream end may be less than the actual width of dunnage forming gears at the forming station.

A first pair of spaced guide plates may be arranged to cooperate with the dunnage being formed and may be arranged to face the same side of the dunnage and the distance between the guides at the start of the forming station may be greater than the distance between the projections and there downstream end.

Pudding means may be provided that may comprise cooperating dunnage forming gears.

According to another aspect a method of using a dunnage forming machine including a forming station and a feeding station comprising: feeding the material from the feeding station in a first direction and pulling the material from the feeding station in a second direction, offset from the first direction.

The present invention includes any combination of features as herein referred to:

BRIEF DESCRIPTION OF THE FIGURES

The present invention may be carried into practice in various ways and one embodiment will now be described by way of example and with reference to the accompanying drawing, in which.

DETAILED DESCRIPTION OF THE INVENTION

Figure 4:
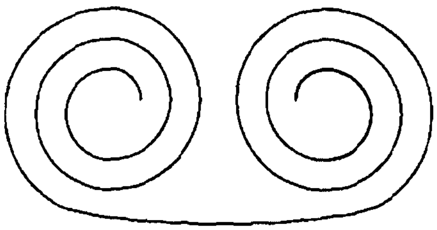
FIG. 4 is a schematic cross section in the paper as it enters the crimping mechanism.

A driven crimping gear 10 cooperates within a first idler crimping gear 12 and a second idler crimping gear 14. The gears 10 and 12 pull paper off a roll (not shown) which, on its way to the gears, passes a former that rolls the edges over each other as shown in FIG. 4. The paper enters the gears in an upward direction and preferably exists the gears in horizontal direction.

Figure 3:
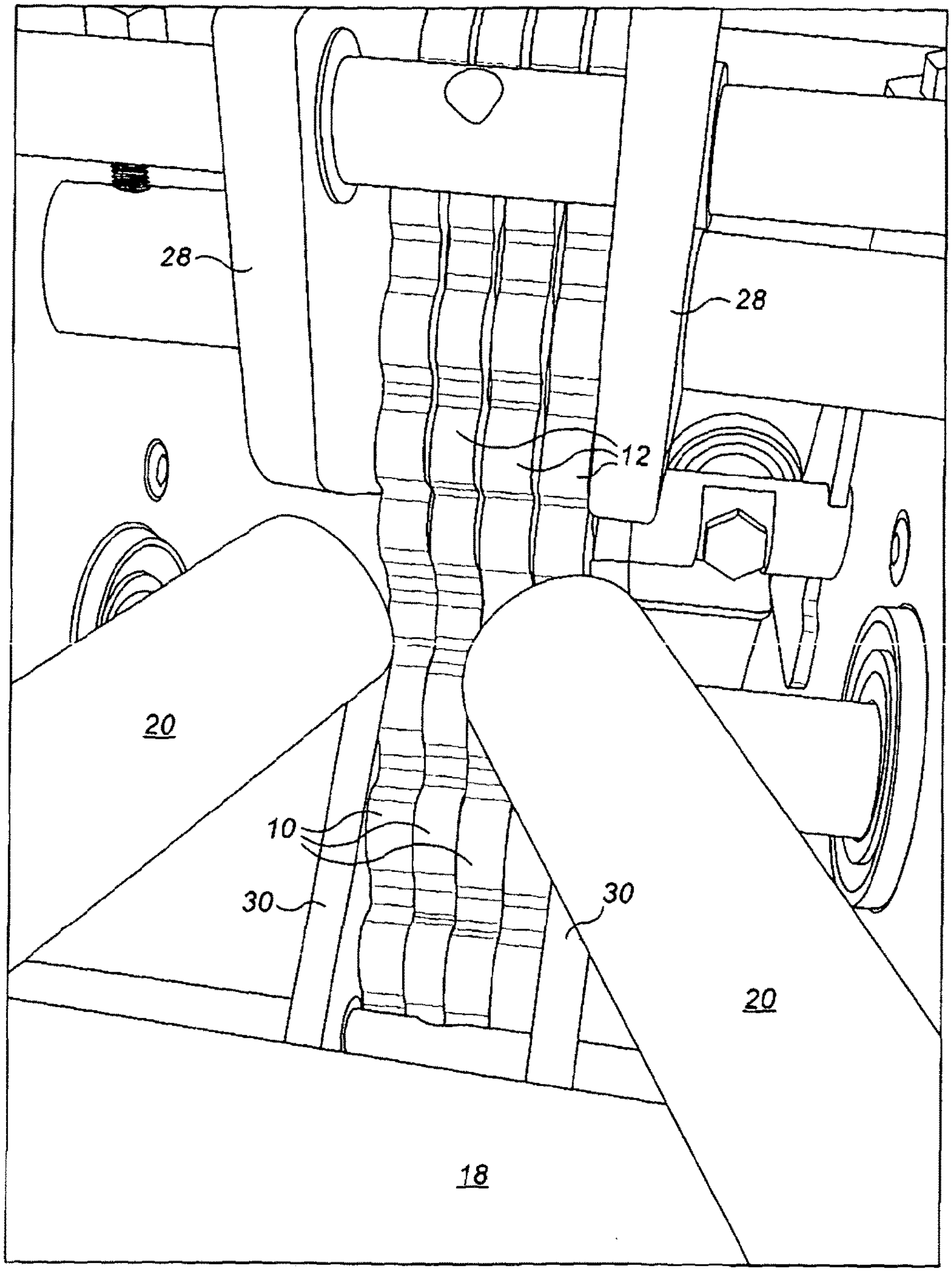
FIG. 3 is a schematic view of the paper feed mechanism.

The former includes a plate 18 that includes rods 20 on each side of the plate. The plate tapers inwardly and upwardly. The plate terminates before the rods 20 preferably when the width of the paper, due to the forming, has been reduced to be a third of the original width. When viewed in FIG. 3, the paper passes behind the plate 18. Angled furls 22 at each side serve to roll the edges of the paper in over itself.

The rods 20 have a diameter of 22 mm and, at the top, the gap between the rods is 5 mm. The rods terminate just below the gears 10 and 12. The width of the gears 10 and 12 is 25 mm. However, the width of the gears may be the same as or less than or more than the distance from the outer sides of the rods 20 across the gap between the rods at the downstream end. As the paper only leaves the former just before the gears and as or than more the furled width of the paper is only marginally wider that the gear width an extremely well furled pack is fed to the gears.

FIG. 4 in a schematic cross section of the paper form that is fed to the gears. It can be seen that the sides are furled over. The sides may undergo one revolution or up to two revolutions on two or more revolutions. As the paper is being pulled and is therefore under tension the paper form shown in FIG. 4 enters gears 10 and 12 and is partially crimped by these gears 10 and 12.

The paper leaves the first idler gear 12 and turns through approximately 90° to then be further crimped by the gear 14 cooperating with the gear 10. It can be seen that the paper remains on the driven gear as it passes between the gears 12 and 14. By providing a single driven gear significant cost savings in coordinating drive mechanisms from a single motor, for instance, are avoided.

Figure 5:
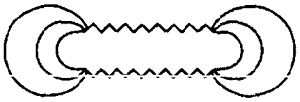
FIG. 5 is a schematic cross section of dunnage formed by the machine.

The formed dunnage is shown in FIG. 5. The inner portion of the previously furled edges has been incorporated into the crimp. Consequently a sturdy dunnage is provided with good volume at a minimal loss of length of paper in compared to length of paper out.

Figure 2:
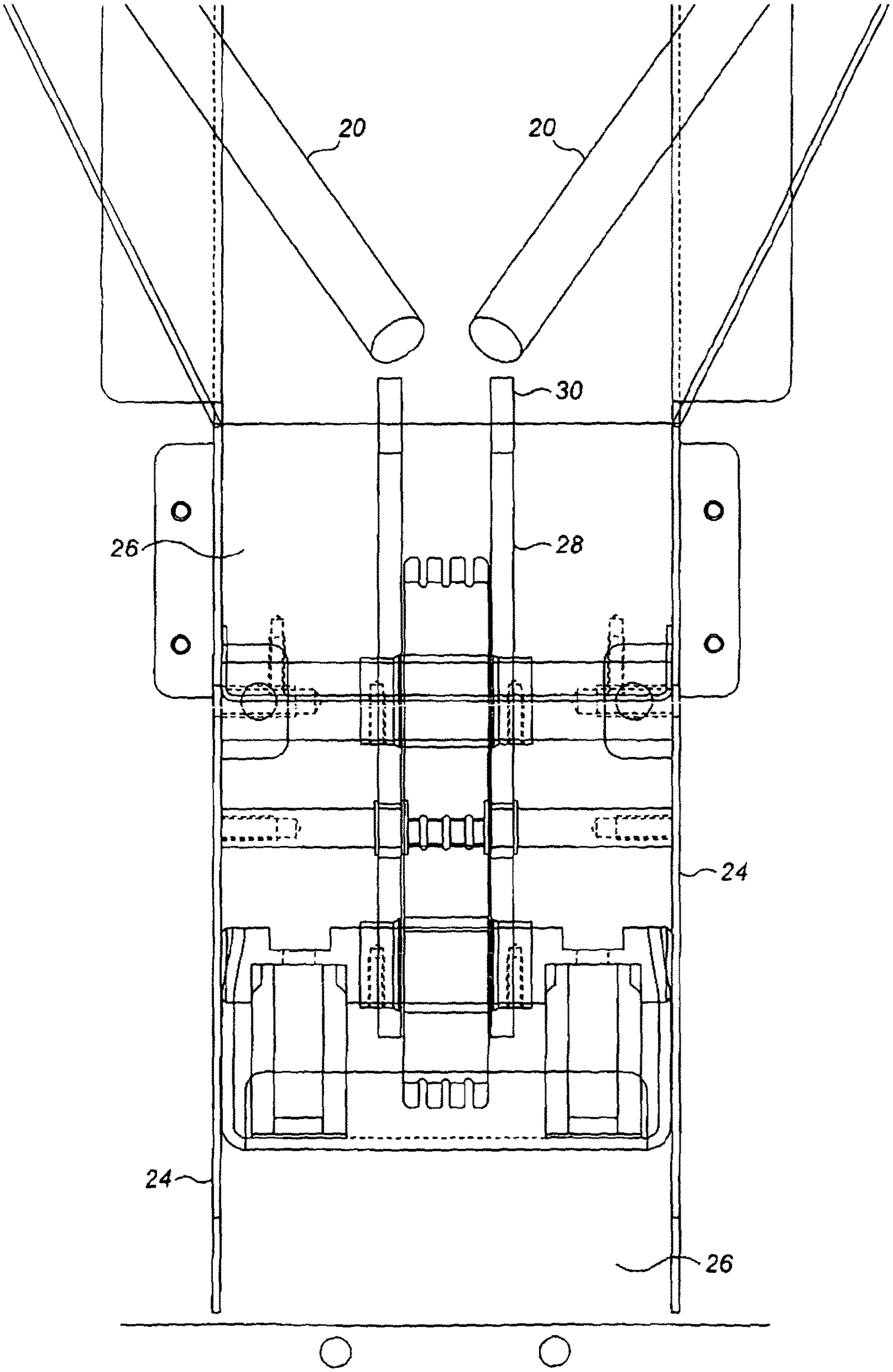
FIG. 2 is an end view.

As shown in FIG. 2, the machine includes side walls 24. However, these walls are solely to conceal the moving parts. They do not serve to keep the paper sides in and to bunch the paper up as in conventional machines. Rather the paper passes through the machine whilst being clear of the walls 24. The edges of the paper are shown by the lines 26.

The machine is provided with a first pair of spaced guide plates 28 that are adjacent to each side of the gears and that pass over the driven gear 10. In addition there is a second pair of guide plates 30 located on each side of the gears below the driver gears. The first pair are located above the second pair.

As the paper is pulled towards the first crimping gears 10 and 12 the outer side regions of the furled paper is gently compressed as it enters a "nip" formed by upwardly and inwardly converging edges 32 and 34 of the plates 28 and 30 respectively. Then the paper is gently held by the plates as they guide the paper from where it leaves the gears 10 and 12. At that stage the guides are arcuate about a common axis comprising the axis of the drive gear 10 with the arc of the plate 28 being just greater than the outside of the one defined by the top of the crimping gears on the gear 10 and the arc of the plates 30 being spaced inwardly from the trough of the crimping gears on the gear 10. This configuration assists in the paper passing from the gear 12 to the gear 14.

As the paper exits the top gears 10 and 14 in the direction shown by arrow 36 the second pair of guide plates incline downwardly as shown by the line 38. The upper plate though extends horizontally as shown by line 40 from the gears 10 and 14 and the dunnage stays with that upper guide to leave the machine.

Figure 1:
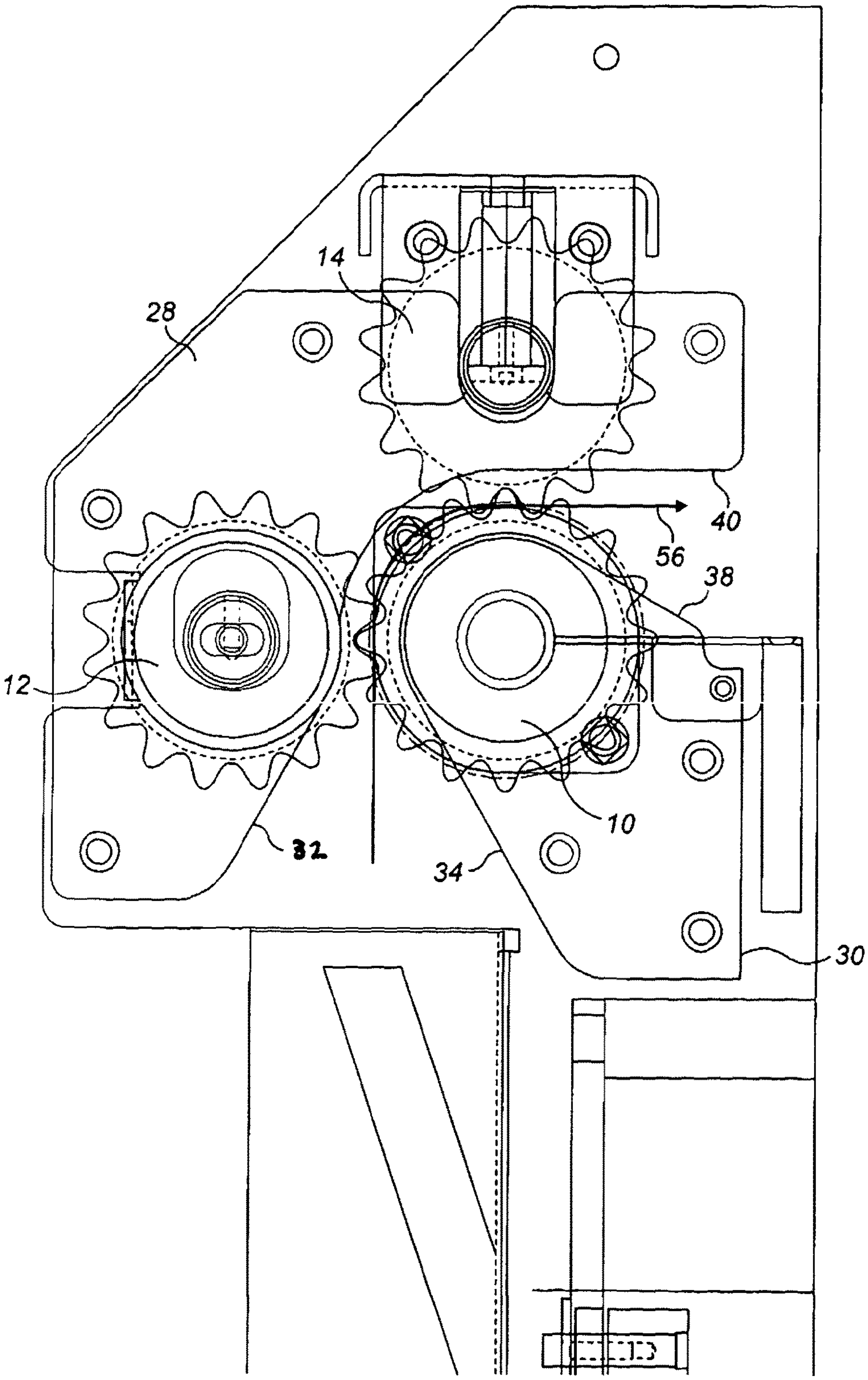
FIG. 1 is a side view of a dunnage forming machine.

To assist in loading a new sheet or sheets of paper into the machine the drive gear 10 is mounted on a sprag or one way clutch mechanism whereby a user can manually rotate the gear 10 in a clockwise direction, when viewing FIG. 1, but not in an anticlockwise direction. To assist in this turning the axial shaft of the drive gear 10 may extend to one side of the machine.

The gears 10, 12 and 14 have been shown as the same size. In one modulation either or both of the gears 12 and 14 may be smaller or larger than the gear 10. Alternatively or additionally there may be more than two gears 12 and 14. When the gears 12 and 14 are smaller than the gear 10 there may be three or more driven gears cooperating with the drive gear 10 to drive the paper in the path shown. In a further possible modification the paper could be caused to take a different path. For instance the paper could be carried to enter the mechanism in the direction shown and to leave the machine after travelling around the gear 10 for more than 90°. Such as 180° so that the dunnage can return substantially parallel to the direction of paper fed to the machine. This guide rails could be modified to extend further around the gear 10 to assist in the paper being caused to follow the modified path.

Whilst the common gear 10 has been referred to as the driver gear it will be appreciated that any one of the gears could be a drive gear as all of the gears mesh with each other.

Figure 6:
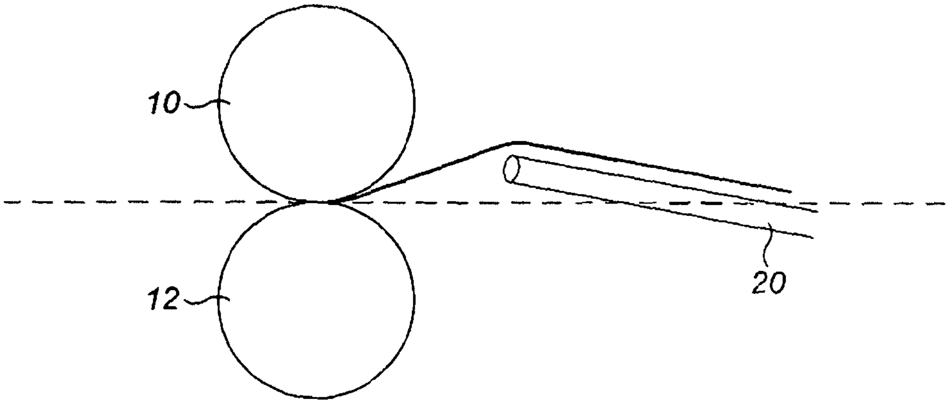
FIG. 6 shows an alternative feed of the purpose to the mechanism.

The paper can be fed to the gears such that the paper is at a tangent to the mod nip point, as shown by the arrow 36 in FIG. 1. Alternatively, the paper could be fed such that it is directed to the gear 10 first, before the mid nip point of the gear 10 and 12. This may cause the paper to bind onto the gear 10 more firmly. Alternatively, or additionally this may cause the paper to have a greater tension as it is draw in off the rods 20 which may assist in causing the furling of the edges and/or assist in maintaining the furled edges as the paper starts to be crimped. An example of an alternative feed is shown in FIG. 6. In FIG. 6 the rods 20 direct the paper to the gear in a direction between the outer teeth and the axis of the gear 10.

The invention claimed is:

1. A dunnage forming machine comprising:

cooperating dunnage forming gears including a sun gear arranged to cooperate with at least two planet gears, and in which material being transformed into a dunnage is arranged to travel around the sun gear between the at least two planet gears; and a first pair of spaced guides arranged to cooperate with the dunnage being formed and arranged to face one side of the dunnage, wherein the first pair of spaced guides are configured to deflect the material from one of the two planet gears to another of the two planet gears.

2. The machine as claimed in claim 1, further comprising a second pair of spaced guides arranged to cooperate within the dunnage being formed and arranged to face the other side of the dunnage.

3. The machine as claimed in claim 2, wherein an arc of the second pair of guides is less than an arc of a dunnage forming portion of the sun gear.

4. The machine as claimed in claim 2, wherein at least one of the first or second pairs of guides is directed towards the sun gear and a first planet gear.

5. The machine as claimed in claim 2, wherein the first and second pairs of spaced guides are adjacent to the sun and two planet gears in an axial direction.

6. The machine as claimed in claim 1, wherein the first pair of spaced guides are arcuate along at least part of their extent such that the first pair of spaced guides form an arcuate path around at least a portion of the sun gear.

7. The machine as claimed in claim 6, wherein the arc of the first pair of spaced guides has substantially the same axis as an arc of the sun gear.

8. The machine as claimed in claim 6, wherein the arc of the first pair of spaced guides is greater than an arc of an outermost dimension of the sun gear.

9. The machine as claimed in claim 1, wherein the first pair of guides leaves a second of the at least two planet gears that cooperates with the sun gear that is in a direction perpendicular to a line connecting to rotational axes of the cooperating sun and the second of the at least two planet gears.

10. The machine as claimed in claim 1, wherein there is no constraint on edges of the dunnage as the dunnage travels through the sun and planet gears.

11. The machine as claimed in claim 1, further comprising more than two planet gears.

12. The machine as claimed in claim 1, wherein the sun gear has a different diameter than the at least two planet gears.

13. The machine as claimed in claim 1, wherein a first line connecting rotational axes of a first planet gear and the sun gear is at a right angle to a second line connecting rotational axes of a second planet gear and sun gear.

14. The machine as claimed in claim 1, wherein a first line connecting rotational axes of a first planet gear of the at least two planet gears and the sun gear extends in a direction opposite to a second line connecting rotational axes of a second planet gear of the at least two planet gears and the sun gear.

15. The machine as claimed in claim 14, wherein the first and second lines are parallel.

16. The machine as claimed in claim 1, wherein the sun gear is a driven gear and the at least two planet gears are arranged to be driven by the sun gear.

17. A dunnage forming machine, comprising:

a first rotating member having teeth;

a second rotating member having teeth that meshes with the first rotating member; and a third rotating member that engages with the first rotating member such that the third rotating member rotates with the first rotating member;

wherein the first rotating member and the second rotating member are configured to receive a multi-layer material in between the first rotating member and the second rotating member, wherein the first rotating member and third rotating member are configured such that the material travels around the first rotating member and between the engagement between the first rotating member and third rotating member.

18. The machine as claimed in claim 17, wherein the material is received between the first rotating member and the second rotating member in a first direction and is arranged to travel around the first rotating member and between the engagement between the first rotating member and third rotating member such that it exits from the engagement between the first rotating member and third rotating member in a second direction.

19. The machine as claimed in claim 17, wherein the third rotating member includes teeth that mesh with the teeth of the first rotating member.

20. The machine as claimed in claim 19, wherein the material passes between the teeth of the second rotating and the first rotating member and also between the teeth of the third rotating and the first rotating member such that the material is crimped.

21. A dunnage forming machine comprising:

a first rotating member;

a second rotating member that engages with the first rotating member such that the second rotating member rotates with the first rotating member;

a third rotating member that engages with the first rotating member such that the third rotating member rotates with the first rotating member; and wherein the first rotating member and the second rotating member are configured to receive material and drive the material via engagement in between the first rotating member and the second rotating member with the material entering along a first direction as it is received at the second rotating member, wherein the first rotating member and third rotating member are configured such that the material travels around the first rotating member and between the engagement between the first rotating member and third rotating member exiting the engagement with the third rotating member in a second direction; and wherein the first direction is defined by the overall material path received by the second member and the second direction is defined by the overall material path after the third rotating member.

22. The dunnage forming machine of claim 21, further comprising a dunnage former located before the engagement between the first rotating member and the second rotating member, wherein the dunnage former is configured to roll or fold the material over on itself thereby forming multiple layers of material such that the multiple layers of material are received between and the first rotating member and the second rotating in such a way as to crimp the multiple layers together.

23. The dunnage forming machine of claim 22, wherein the overall direction of all of the multiple layers of the material are changed between the first direction and the second direction.

* * * * *